United States Patent [19]

Hanzawa et al.

[11] 4,178,809
[45] Dec. 18, 1979

[54] MODE CHANGE-OVER DEVICE FOR RECORDING AND/OR REPRODUCING APPARATUS

[75] Inventors: Hisashi Hanzawa; Kozi Yoshino, both of Tokyo, Japan

[73] Assignee: Sony Corporation, Tokyo, Japan

[21] Appl. No.: 886,428

[22] Filed: Mar. 14, 1978

[30] Foreign Application Priority Data

Mar. 17, 1977 [JP] Japan ............................ 52-33180[U]

[51] Int. Cl.² .................. G05G 1/02; G05G 5/08; G11B 15/10
[52] U.S. Cl. ............................. 74/483 PB; 74/84 R; 74/435; 242/201
[58] Field of Search ............... 74/10.27, 483 PB, 435, 74/84; 360/93-96; 242/201

[56] References Cited

U.S. PATENT DOCUMENTS

| | | | |
|---|---|---|---|
| 2,290,644 | 7/1942 | Knos | 74/10.27 |
| 2,388,581 | 11/1945 | Soffietti | 74/10.27 X |
| 2,917,939 | 12/1959 | Harris | 74/435 |
| 3,943,567 | 3/1976 | Kazuo | 360/93 |
| 3,976,263 | 8/1976 | Suzuki | 242/201 |
| 4,131,922 | 12/1978 | Yoshida et al. | 360/96 |

*Primary Examiner*—Allan D. Herrmann
*Attorney, Agent, or Firm*—Lewis H. Eslinger; Alvin Sinderbrand

[57] ABSTRACT

A mode change-over device for a recording and/or reproducing apparatus includes plural push buttons depressible into different operative positions; a mode selecting lever movable to plural positions in accordance with the selective depression of the push buttons; a mode change-over lever movable to plural operative positions in accordance with the movement of the mode selecting lever; and a drive mechanism for driving the mode change-over lever in any one of the plural operative positions.

10 Claims, 9 Drawing Figures

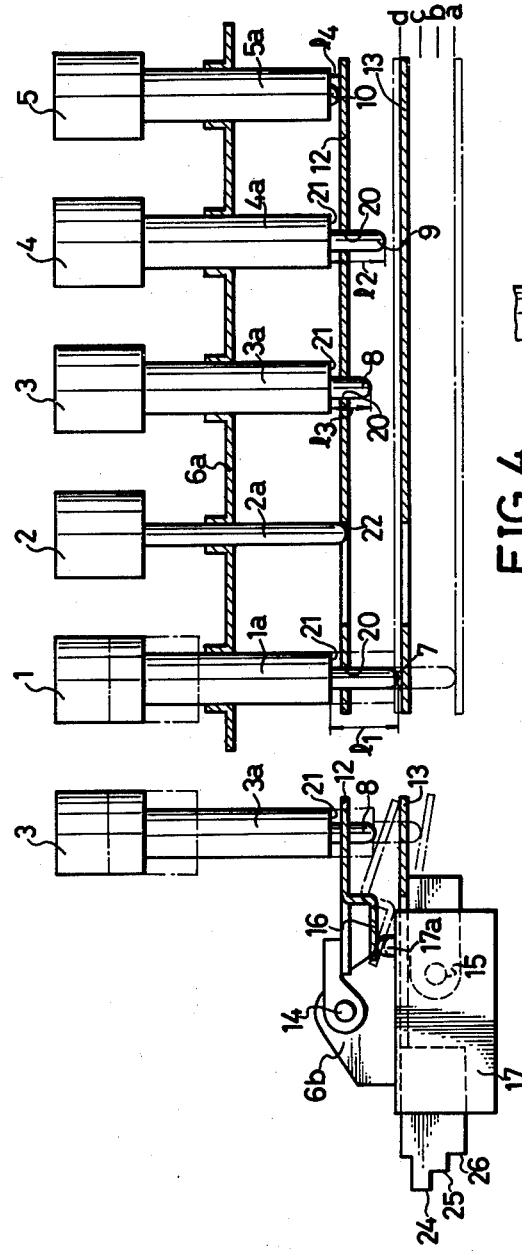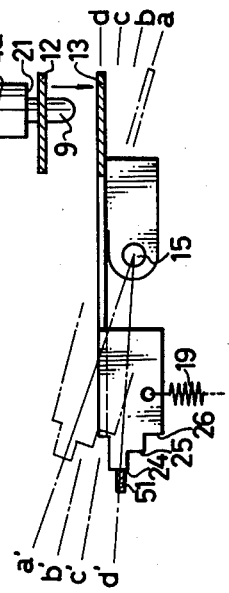

MODE CHANGE-OVER DEVICE FOR RECORDING AND/OR REPRODUCING APPARATUS

BACKGROUND OF THE INVENTION

1. Field of the Invention

This invention relates to a mode change-over device for a recording and/or reproducing apparatus.

2. Description of the Prior Art

Recording and/or reproducing devices, such as tape recorders, are provided with mode change-over devices to place the recorder into any one of its operating modes. Typically such operating modes are the reproduce, record, fast-forward, rewind and stop modes. In most such recorders selection of any one of the operating modes is accomplished by depressing a push button corresponding to the desired operating mode. Some of these mode selecting mechanisms include a plurality of slides and levers which move responsive to the selective depressing of a mode selecting push button. A representative example of this type of mode selecting device is that shown in U.S. Pat. No. 3,976,263. Such lever and slide systems are relatively complex in construction.

SUMMARY OF THE INVENTION

Accordingly, it is an object of this invention to provide a mode change-over device for a recording and/or reproducing apparatus which is very simple in construction.

Another object of this invention is to provide a mode change-over device for a recording and/or reproducing apparatus in which the selected mode of the apparatus to be changed over can be readily selected.

In accordance with an aspect of this invention, a mode change-over device for a recording and/or reproducing apparatus includes plural push buttons selectively depressible to place the apparatus into different operative positions; a mode selecting means movable to plural positions in accordance with the selective depression of the plural push buttons; a mode change-over means movable to plural operative positions in accordance with the movement of the mode selecting means; and a drive mechanism for driving the mode change-over means in any one of the plural operative positions.

The foregoing and other objects, features, and advantages of the present invention will be more readily understood upon consideration of the following detailed description of the preferred embodiment of the invention, taken in conjunction with the accompanying drawings.

BRIEF DESCRIPTION OF THE DRAWINGS

FIG. 2 is a cross-sectional view taken along line II—II of FIG. 1;

FIG. 3 is a cross-sectional view taken along line III—III of FIG. 1;

FIG. 4 is a cross-sectional view taken along line IV—IV of FIG. 1;

DESCRIPTION OF THE PREFERRED EMBODIMENTS

Figure 1:
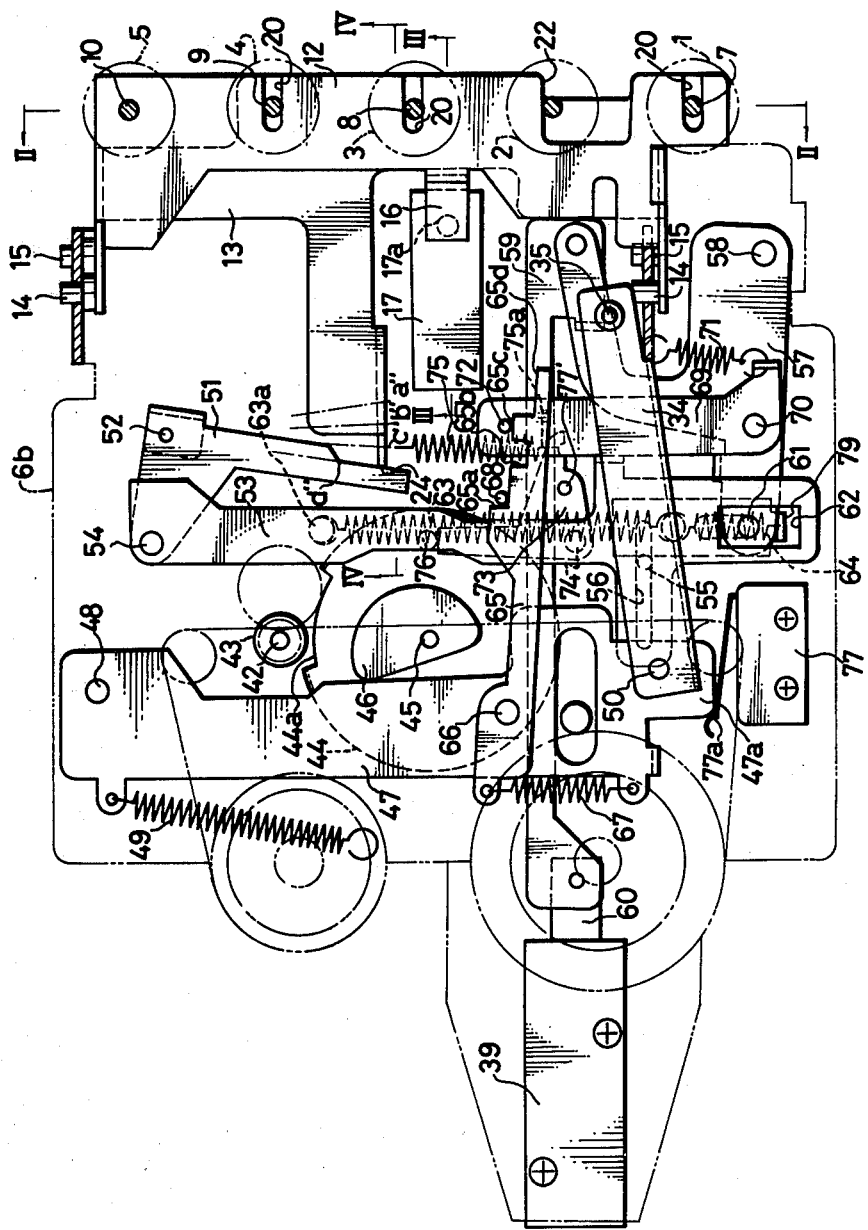
FIG. 1 is a plan view of a tape recorder provided with one embodiment of the mode selecting device of this invention.

As best seen in FIGS. 1 and 2, a plurality of depressible push buttons 1–5 are provided for selectively placing a tape recorder into a selected operating mode. Referring to FIG. 2, rewind push button 1, stop push button 2, reproducing push button 3, fast-forward push button 4 and record push button 5 are arranged in a line, and are held in an upper chassis 6a by a holding mechanism (not shown) so as to be movable in a vertical direction between a first position and a second operative position.

All of the push buttons, namely mode selecting push buttons 1, 3, 4 and 5, except the stop push button are locked when moved into their respective depressed position by a lock mechanism (not shown). When stop push button 2 is depressed any one of the push buttons 1, 3, 4 and 5 which is depressed is released from the lock mechanism, and is pushed back to its first inoperative position.

Each of the push buttons 1, 3, 4 and 5 include depending slide members 1a, 3a, 4a and 5a, respectively, terminating in projections 7, 8, 9 and 10, respectively. The lengths of the projections 7, 8, 9 and 10 are different from each other. Projection 7 of rewind push button 1 is longest ($l_1$); projection 10 of record push button 5 is shortest ($l_4$); and projection 9 of fast-forward push button 4 is longer than projection 8 of the reproducing push button 3 ($l_2 > l_3$).

As shown in FIG. 2, the lower ends of projections 7 to 10 of push buttons 1, 4, 3 and 5, when the push buttons are depressed, are at the levels a, b, c and d, respectively. As seen, the level a of the lower end of projection 7 of the depressed rewind push button 1 is the lowest; the level d of the projection 10 of the depressed record push button 5 is the highest; and the level c of the projection 8 of the depressed reproducing push button 3 is higher than the level b of the projection 9 of the depressed fast-forward push button 4. Thus, the actuating positions of the mode selecting push buttons 1, 3, 4 and 5 are different from each other.

The mode change-over device also includes a switch operating level 12 arranged beneath the push-button assembly and a mode selecting lever 13 so arranged beneath switch operating lever 12 so as to be parallel with the latter. Levers 12 and 13 are rotatably supported on support pins 14 and 15, respectively, fixed on a lower chassis 6b.

Switch operating lever 12 includes stopped portion 16 which contacts an actuator 17a of a micro-switch 17 mounted on the chassis 6b (FIG. 3), and switch operating lever 12 is urged upwardly (or in the counter-clockwise direction) by a spring attached to actuator 17a which is contained in micro-switch 17. In other words, switch operating lever 12 is urged toward the push-button assembly by the spring contained in the micro-switch 17. As best shown in FIG. 4, mode selecting lever 13 is urged in the counter-clockwise direction around support pin 15 by a restoring spring 19 fixed on mode selecting lever 13 and chassis 6b.

The projections 7, 8 and 9 of the mode selecting push buttons 1, 3 and 4, respectively, extend through slots 20 formed on switch operating lever 12. Thus, when any one of the mode selecting push buttons 1, 3 and 4 is depressed, projections 7, 8, or 9 extend through the respective slot 20 to contact mode selecting lever 13 which is pivoted by the lower end of the corresponding projections 7, 8 or 9 of mode selecting push buttons 1, 3 or 4, so that mode selecting lever 13 is rotated in the clockwise direction about support pin 15 (FIG. 4). Projection 10 of record push button 5 is in contact with the upper surface of switch operating lever 12. Accordingly, when record push button 5 is depressed it does not extend below lever 12 and, thus, mode selecting lever 13 is not rotated.

Each of the slide members 1a, 3a, 4a and 5a, respectively, include a shoulder 21 formed above the respective projections. When a mode selecting push button 1, 3 or 4 is depressed, switch operating lever 12 is contacted and moved by the corresponding shoulder 21 of the push-button slide to rotate lever 12 in a clockwise direction about support pin 14 (FIG. 3). Depressing push button 5 also rotates lever 12 as the switch operating lever 12 is moved by the lower end of projection 10 of the record push button 5 to rotate lever 12 in a clockwise direction about support pin 14. With the clockwise rotation of switch operating lever 12, actuator 17a of micro-switch 17 is depressed by stepped portion 16 of switch operating lever 12. Depressing push button 2 does not cause lever 12 to rotate as the slide of stop push button 2 passes through a cut-out portion 22 formed in switch operating lever 12. Accordingly, when stop push button 2 is depressed switch operating lever 12 is not rotated.

As above described, the actuating positions of the three mode selecting push buttons are different as indicated by the levels a, b and c. Accordingly, when the mode selecting push buttons are selectively depressed, three different degrees of clockwise rotation of the mode selecting lever 13 is obtained. As shown in FIG. 4, the top end of mode selecting lever 13 is rotated to a first position indicated as a' with the depression of rewind push button 1; it is rotated to a second position indicated as b' with the depression of fast-forward push button 4; and it is rotated to a third position indicated as c' with the depression of reproducing push button 3. It is also seen that when record push button 5 is depressed, mode selecting lever 13 is not rotated. Thus, the upper end of mode selecting lever 13 is maintained at its original position indicated as d'.

Figure 5:
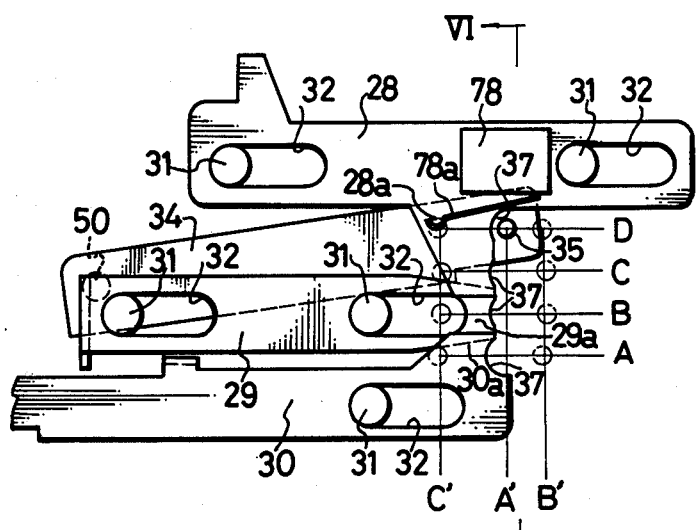
FIG. 5 is a plan view of important parts of the tape recorder of FIG. 1.

As best seen in FIG. 5, a recording/reproducing slide 28, a fast-forward slide 29 and a rewind slide 30 are provided and arranged above upper chassis 6a so as to be parallel with each other. The three slides 28, 29 and 30 each include a pair of oblong openings 32 which receive a pair of guide pins 31 extending from upper chassis 6a. Thus the slides are slidably disposed so as to be slidable in their lengthwise directions. Reproducing slide 28 is interlocked with a reproducing mode change-over mechanism (not shown) such as a head chassis and a forward idler. Fast-forward slide 29 is interlocked with a fast-forward mode change-over mechanism (not shown) such as a fast-forward idler. Rewind slide 30 is interlocked with a rewind mode change-over mechanism (not shown) such as a rewind idler.

Figure 6:
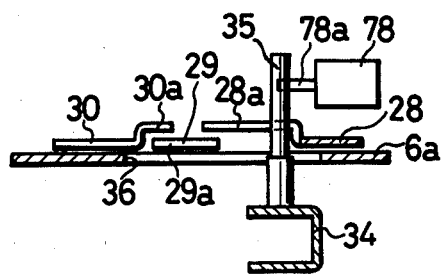
FIG. 6 is a cross-sectional view taken along line VI—VI of FIG. 5.

A mode change-over lever 34 is provided which works to selectively operate the three slides 28, 29 and 30 so as to change over the tape recorder into either the reproducing mode or recording mode, the fast-forward mode or the rewind mode. As shown in FIG. 6, a mode change-over pin 35 is fixed on the top end portion of mode change-over lever 34 and is projected upward through an opening 36 made in upper chassis 6a. Pin 35 when properly located selectively drives the three slides 28, 29 and 30 on a straight line path as indicated by the lines A, B, C and D shown in FIG. 5. Mode change-over lever 34 and its projecting pin 35 drive slides 28 and 30 when pin 35 is positioned adjacent recess 37 in an extending projection 28a and 30a of each slide, respectively, and drives slide 29 when pin 35 is adjacent recess 37 in the end 29a of slide 29. Projection 28a of reproducing slide 28 includes a pair of recesses 37 so that pin 35 can be selectively positioned in either recess to move slide 28 along the paths indicated at C and D. Positioning of pin 35 is controlled by a plunger solenoid 39 fixed to lower chassis 6b which controls movement of change-over lever 34 to position pin 35 in the selected recess 37 of levers 28, 29 and 30.

Next, the relationship between the mode change-over lever 34 and the mode selecting lever 13, and a mechanism for driving the mode change-over lever 34 with the plunger-solenoid 39 will be described.

Referring to FIG. 1, a drive gear 43 is provided fixed to a capstan 42. Drive gear 43 engages a gear wheel 44 having a toothless segment 44a supported by a shaft 45 so as to be rotatable relative to lower chassis 6b. A cam 46 is fixed on the upper surface of gear wheel 44. Cam 46, as will be explained hereinbelow, cooperates with a swing lever 47 rotatably supported by a support pin 48 so as to be rotatable relative to lower chassis 6b. Swing lever 47 is urged to pivot in the counter-clockwise direction (FIG. 1) about support pin 48 by a tension spring 49. Swing lever 47 is also connected to one end of mode change-over lever 34 by a pin 50 fixed on the lower end of the swing lever 47 which is pivotally connected to lever 34.

A substantially L-shaped stop lever 51 is also provided and is rotatably supported on chassis 6b by a support pin 52. One arm of stop lever 51 contacts the top end portion of mode selecting lever 13 (see FIG. 4 as well). The rotational position of stop lever 51 is determined by its contact with the top end portion of the mode selecting lever 13. As shown, four angular positions can be selected by the mode selecting lever 13 depending on the rotational position of lever 13. Lever 13 includes an end segment having a first surface 24, a step forming a second surface 25 and a step forming a third surface 26. Depending upon the angular position of lever 13, that is whether it is in any of the positions indicated as a', b', c' or d', stop lever 51 can move to any of the positions indicated as a", b", c" or d" in FIG. 1.

An interconnecting lever 53 is provided which is pivoted at one end to a pin 54 secured to stop lever 51. Interconnecting lever 53 includes an extending segment at its other end provided with an oblong opening 56 into which a pin 55 projecting downwardly from mode change-over lever 34 is inserted. Thus interconnecting lever 53 engages with mode change-over lever 34. A transmission lever 57 is provided which is rotatably supported by a support pin 58 fixed on the lower chassis 6b. One end of transmission lever 57 is connected by an interconnecting slide member 59 to the extensible rod 60 of plunger-solenoid 39. A pin 61 is fixed on the other end of transmission lever 57 and is disposed within an oblong opening 62 formed in the lower end portion of interconnecting lever 53.

Levers 53 and 51 are spring biased with interconnecting lever 53 being biased to be urged upwardly (FIG. 1) by a restoring spring 63 having one end secured to lever 53 and the other end secured to a post 63a fixed to the chassis. Transmission lever 57 is connected to the interconnecting lever 53 through a restoring spring 64 and an auxiliary lever 79 and is urged in the clockwise direction (FIG. 1) about pin 58 by a spring 71.

A lock lever 65 is also provided and lock lever 65 is pivoted at one end to a pin 66 extending from swing lever 47 and is urged in the counter-clockwise direction (FIG. 1) about pin 66 by a restoring spring 67 extending between one part of swing lever 47 and one end of lock lever 65. Thus lock lever 65 is always urged toward a lock pin 68 extending from lower chassis 6b. Lock lever 65 includes two locking portions 65a and 65b for engagement with lock pin 68 and two lock-release projections 65c and 65d.

A lock-release lever 69 is provided and is pivotally connected at one end to a pin 70 fixed on the transmission lever 57. Lock release lever 69 is urged to pivot in the counter-clockwise direction (FIG. 1) about pin 70 by a restoring spring 71. The other end of lock release lever 69 includes a lock release pin 72 adapted to selectively engage lock release projections 65c and 65d.

An L-shaped gear lock lever 73 is rotatably supported adjacent gear wheel 44 by a support pin 74 fixed on the lower chassis 6b. Gear lock lever 73 is urged to pivot in the counter-clockwise direction (FIG. 1) about support pin 74 by a restoring spring 75 having one end 75a fixed on an arm of lock lever 73 and its other end secured to the chassis in any convenient manner. The upper end of gear lock lever 73 contacts a pin 76 extending from the lower surface of gear wheel 44 to lock the gear wheel 44. Pivoting of lock lever 73 moves the upper end of the lever away from pin 76 to release the lock of the gear wheel 44. Gear lock lever 73 is also provided with an extending pin 77' which will be referred to hereinbelow.

DESCRIPTION OF MODE CHANGE-OVER OPERATIONS

FIG. 1 illustrates the device of the present invention in the stop mode of the tape recorder in which each of the levers, slides and pins is located at its original at rest position. Pin 35 of mode change-over lever 34 lies at the position A' on the line D, as shown in FIG. 5. When a power switch is turned on to supply electric power to the tape recorder, capstan 42 is rotated in the counter-clockwise direction. However, since drive gear 43 faces toothless segment 44a of gear wheel 44, gear wheel 44 is not driven by drive gear 43.

To place the recorder in a record mode, record push button 5 is depressed. With the depression of record push button 5, switch operating lever 12 is rotated to its operative position, as described above (dotted line position shown in FIG. 3), to push actuator 17a of microswitch 17 at its stepped portion 16. Micro-switch 17 is turned on and energizes plunger-solenoid 39. Since record push button 5 when it is depressed is locked in its depressed position, micro-switch 17 remains in an on condition.

Figure 8A:
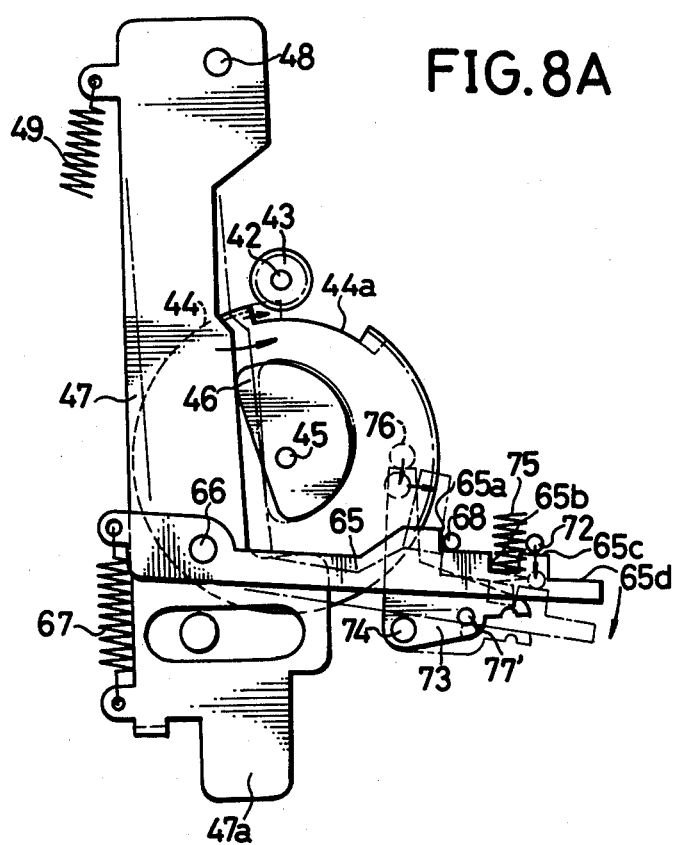
FIG. 8A and FIG. 8B are plan views showing the relationship between a lock lever, the swing lever, the gear wheel and the cam fixed on the gear wheel in the tape recorder of FIG. 1.

With the energization of plunger-solenoid 39, extensible rod 60 is pulled inwardly to rotate transmission lever 57 in a counter-clockwise direction (FIG. 1) about its support pin 58 through interconnecting slide 59 and lock release lever 69 is moved downwardly (FIG. 1), since it is connected through pin 70 with transmission lever 57. Projection 65c of lock lever 65 is pushed by pin 72 fixed on the top end of lock release lever 69, as shown by the arrow in FIG. 8A, so that lock lever 65 is also rotated in a clockwise direction about pin 66 against its restoring spring 67, as shown by the curved arrow in FIG. 8A. With this movement, lock portion 65a of lock lever 65 is separated from the lock pin 68 and, as a result, swing lever 47 is released from its locked position. At the same time, since pin 77' fixed on gear lock lever 73 is pushed by moving lock lever 65, gear lock lever 73 is rotated in a clockwise direction (FIG. 1) about its support pin 74 against the urging of its restoring spring 75 to remove lock lever 73 from abutting contact with pin 76 fixed on gear wheel 44. Accordingly, gear wheel 44 is released from its locked position.

With the counter-clockwise rotation of transmission lever 57, interconnecting lever 53 is pulled through auxiliary lever 79 and restoring springs 64 and 63. Thus a counter-clockwise rotational force is imparted to stop lever 51 about support pin 52. However, since stop lever 51 contacts the uppermost step 24 of the top end portion of mode selecting lever 13, which is at rest at its original position d' as shown in FIG. 4, stop lever 51 is not rotated, but stops at position d" (FIG. 1). Accordingly, further movement of interconnecting lever 53 is arrested. Mode change-over pin 35 on mode change-over lever 34 is maintained at the position shown at A' on line D (FIG. 5).

However, since gear wheel 44 is released from lock lever 73, swing lever 47 is rotated in a counter-clockwise direction (FIG. 1) about support pin 48 by its restoring spring 49, to begin to drive gear wheel 44 through cam 46 in the clockwise direction. Accordingly, gear wheel 44 is engaged with drive gear 43 rotating with capstan 42 to rotate gear wheel 44 in a clockwise direction (FIG. 1). With this movement, mode change-over pin 35 of mode change-over lever 34 is moved backward to the position shown at B' from the position shown at A' on line D (FIG. 5 and FIG. 7).

Figure 7:
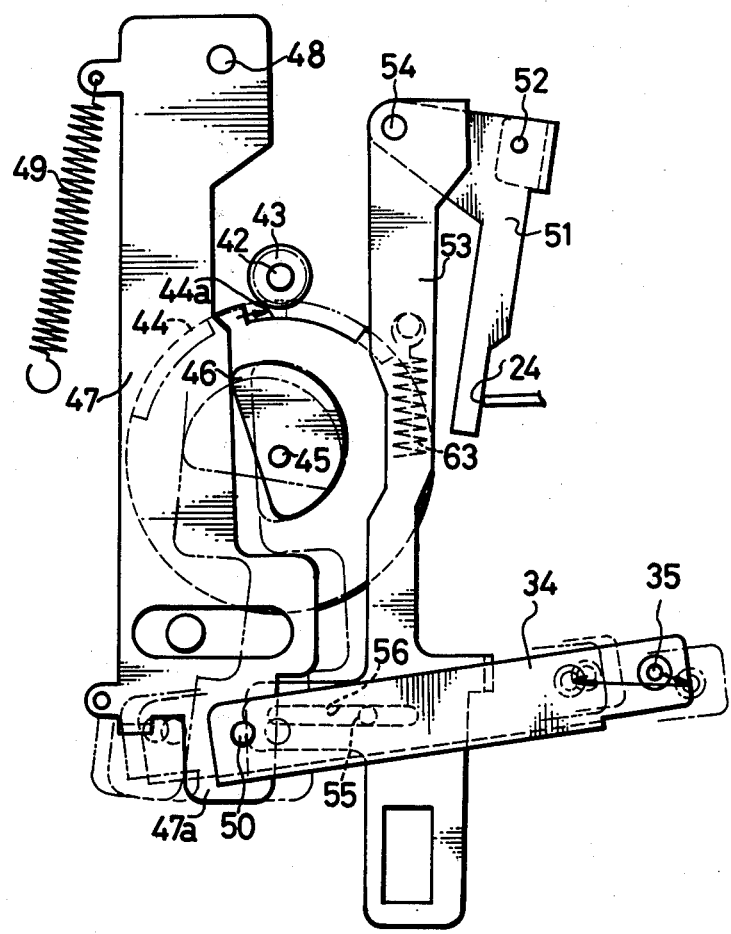
FIG. 7 is a plan view showing the relationship between a mode change-over lever, a swing lever, a gear wheel and a cam fixed on the gear wheel in the tape recorder of FIG. 1.

With further rotation of gear wheel 44, swing lever 47 is further rotated in a clockwise direction about its support pin 48 (FIG. 1) through cam 46 against the action of its restoring spring 49, and mode change-over lever 34 is now moved leftward as viewed in FIG. 7. Since pin 55 of mode change-over lever 34 is guided within oblong opening 56 formed in interconnecting slide 53, mode change-over lever 34 moves so that mode change-over pin 35 is moved substantially in a linear path to the position shown at C' from the position shown at B' on the line D (FIG. 5 and FIG. 7). Projection 28a of reproducing slide 28 is moved leftward (as viewed in FIG. 5) by mode change-over pin 35, to change the tape drive system into the reproducing mode. At that time, an actuator 78a of a micro-switch 78 mounted on slide 28 is depressed by mode change-over pin 35. Micro-switch 78 is placed in an "on" condition. Accordingly, the electric circuit for the tape recorder is changed over from the reproducing mode into the record mode responsive to micro-switch 78.

When swing lever 47 is rotated in the clockwise direction (FIG. 1), an actuator 77a of a micro-switch 77 is depressed by a switch operating portion 47a formed on swing lever 47. Micro-switch 77 turns to its "on" position to deenergize plunger-solenoid 39. With deenergization of plunger-solenoid 39, interconnecting lever 53, transmission lever 57 and the lock release lever 69 are restored to their original at rest positions through springs 64 and 71, respectively. Thus, the energizing time for the plunger-solenoid 39 is very short and the consumed electric power is minimized.

Figure 8B:
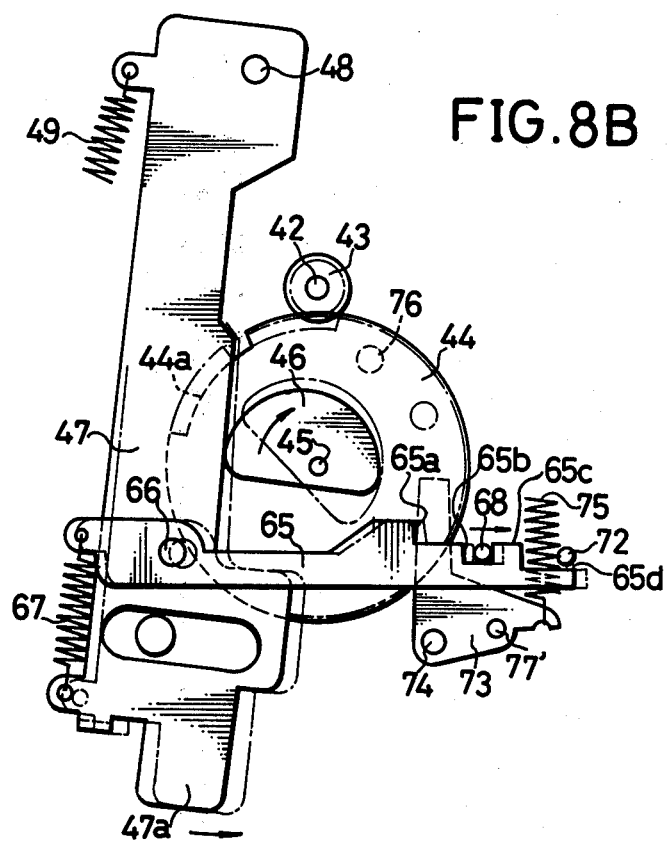

When gear wheel 44 has been rotated through a predetermined angle, and thereby reproducing slide 28 has been moved to the position shown at C' on line D (FIG. 5) by mode change-over pin 35, lock portion 65b of lock lever 65 is engaged with lock pin 68 (FIG. 8B) and swing lever 47 is again placed in a locked position. Mode change-over pin 35 is stopped at the position shown at C'. Thus, reproducing slide 28 is locked at its operative position by mode change-over pin 35 on mode change-over lever 34. At this juncture gear wheel 44 has been rotated almost one complete revolution and it is disengaged from drive gear 43 to stop further rotation. Thus, the change-over operation to place the recorder in the record mode is completed.

The tape recorder according to this embodiment is designed so as to be changeable through the stop mode into any one of reproducing record, fast-forward or rewind mode from any other of these modes.

For example, if the recorder is in the above-described record mode and stop push button 2 is depressed record push button 5 is released from a locked position and record push button 5 is restored to its original position. With push button 5 moving to its original position, switch operating lever 12 also rotates back to its original position and micro-switch 17 is turned off. With micro-switch 17 in its "off" mode, plunger-solenoid 39 is again energized and transmission lever 57 is rotated in a counter-clockwise direction (FIG. 1). Pin 72 of lock-release lever 69 pushes down on lock release projection 65d of lock lever 65. Lock lever 65 is thereby rotated slightly in a clockwise direction (FIG. 1) and lock portion 65b of lock lever 65 is separated from lock pin 68. Swing lever 57 rotates slightly in a counter-clockwise direction (FIG. 1). With this movement mode change-over pin 35 of mode change-over lever 34 is moved along a substantially linear path back to the position shown at A' from the position shown at C' on line D (FIG. 5). With the slight counter-clockwise rotation of swing lever 47, lock portion 65a of lock lever 65 is again engaged by lock pin 68. Thus, swing lever 47 is again locked at its original position after a slight rotation movement. Cam 46 is moved by swing lever 47 and gear wheel 44 is rotated to its initial angular position. Pin 76 fixed on gear wheel 44 again contacts with gear lock lever 73 and gear wheel 44 is locked at its initial angular position.

With the movement of the mode change-over pin 35 to the position shown at A' on line D (FIG. 5), reproducing slide 28 is moved back to its original position. When swing lever 47 is rotated back to its original position, micro-switch 77 is turned off thus deenergizing plunger-solenoid 39. With the movement of mode change-over pin 35 on mode change-over lever 34 to the position shown at A' on line D, micro-switch 78 is also turned off and the electric circuit is changed over into the reproducing mode. Thus, the change over operation for the stop mode is completed.

When the reproducing push button 3 is depressed with the recorder in the stop mode, mode selecting lever 13 is rotated to the position shown at c' (FIG. 4). Stop lever 51 thus rotates until it abuts step 25 of lever 13 or to the angular position shown at c" (FIG. 1). Mode change-over lever 34 connected through interconnecting slide 53 with stop lever 51 is correspondingly rotated in a clockwise direction about its support pin 50 and mode change-over pin 35 on lever 34 moves to the position shown at A' on line C (FIG. 5) in a substantially linear path. As a result of this movement, reproducing slide 28 is also moved to the left (as viewed in FIG. 5), and the tape recorder is changed over into the reproducing mode. Since mode change-over pin 35 contacts projection 28a on reproducing slide 28 and slide 28 moves along the line or path shown at line C, there is no contact to the actuator 78a of the micro-switch 78 by pin 35 and micro-switch 78 is not turned on and the recorder remains in its electrical mode for reproducing.

When fast-forward push button 4 is depressed with the recorder in the stop mode, mode selecting lever 13 is rotated to the position shown at b' (FIG. 4). Stop lever 51 thus rotates until it contacts step 26 of mode selecting lever 13 and moves to the angular position shown at b" (FIG. 1). Mode change-over lever 34 connected through interconnecting slide 53 with stop lever 51 is correspondingly rotated in a clockwise direction about its support pin 50. Mode change-over pin 35 on mode change-over lever 34 moves to the position shown at A' on the line B (FIG. 5) in a substantially linear path of movement. As a result of this movement, fast-forward slide 29 is moved to the left (as viewed in FIG. 5) by mode change-over pin 35 and the tape recorder is changed over into the fast-forward mode.

When rewind push button 1 is depressed with the recorder in the stop mode, mode selecting lever 13 is rotated to its uppermost position shown at a' (FIG. 4). In this case, stop lever 51 is not regulated by mode selecting lever 13 and stop lever 51 rotates to the angular position shown at a" (FIG. 1). Mode change-over lever 34 connected through interconnecting slide 53 with stop lever 51 is correspondingly rotated in a clockwise direction about its support pin 50. Mode change-over pin 35 moves to the position shown at A' along a substantially linear path of movement along the line shown at A (FIG. 5). As a result of this movement, rewind slide 30 is moved to the left (as viewed in FIG. 5) by mode change-over pin 35 and the tape recorder is change over into the rewind mode.

While the preferred embodiment has been described, variations thereto will occur to those skilled in the art within the scope of the present inventive concepts which are delineated by the following claims.

For example, in the above described embodiment, the strokes of the push buttons 1, 3, 4 and 5 are equal to each other, but the lengths of the projections 7, 8, 9 and 10 thereof are different from each other in order that the substantive operative or actuating positions of the push buttons 1, 3, 4 and 5 differ from each other. However, it is evident that the strokes of the push buttons 1, 3, 4 and 5 may be made to differ from each other and that the lengths of the projections 7, 8, 9 and 10 may be equal to each other.

While the above described embodiment of the present invention has been described as being applicable to a tape recorder, it is understood that this invention is not limited to a tape recorder but that this invention may be applicable to any other recording and/or reproducing apparatus such as a video tape recorder (VTR).

Further, in the above described embodiment, the push buttons are so designed as to move back and forth in a linear path but they may be designed so as to rotate back and forth.

In addition, in the above described embodiment, mode selecting lever 13, mode change-over lever 34 and pin 35 fixed thereon are used as a mode change-over means, and the rotational force of capstan 42 is used for the drive mechanism which is actuated with plunger-solenoid 39. However, any other mechanism may be used instead of the above described construction to provide the motive forces necessary to effect the corresponding movements to effect mode change over.

What is claimed is:

1. A mode change over device for a recording and/or reproducing apparatus comprising a plurality of push buttons corresponding to a selected one of a plurality of operating modes of said recording and/or reproducing apparatus, mode selecting means movable to a selected one of a plurality of positions in accordance with the selective actuation of one of said plurality of push buttons, mode change over means selectively movable from a first rest position to a plurality of operative positions corresponding to movement of said mode selecting means to one of said plurality of positions, a plurality of mode selecting levers and a drive mechanism including drive means for said drive mechanism to selectively drive said drive mechanism through predetermined degrees of angular rotation to move said mode change over means from said rest position to one of said plurality of operating positions thereby to move selected ones of said mode selecting levers from a first inoperative position to a second operative position to effect mode change in said recording and/or reproducing apparatus corresponding to the operative mode selected by the particular push button which has been activated.

2. A mode change over device according to claim 1 wherein said push buttons include projections formed on each of said push buttons adapted to contact said mode selecting means upon selective depression of said push buttons and wherein said projections are of different lengths whereby said mode selecting means is moved through a different path of movement upon selective depression of each of said plurality of push buttons.

3. A mode change over device according to claim 1 further including means to lock said mode change over means in an operative position when one of said plurality of push buttons has been selectively actuated to place said apparatus in one of its operating modes.

4. A mode change over device according to claim 1 wherein said mode change over means comprises a pivotally mounted swing lever actuated by said drive mechanism to control a mode change over lever pivotally mounted on said swing lever and said mode change over lever is operatively coupled to said plurality of mode selecting levers to effect corresponding movement in a selected one of said mode selecting levers to effect a change in operative mode of said recording and/or reproducing apparatus corresponding to the actuation of a selected one of said push buttons.

5. A mode change over device according to claim 4 wherein a lock lever is pivotally mounted on said swing lever to lock said mode change over device in the operative mode corresponding to the actuation of a selected one of said push buttons.

6. A mode change over device according to claim 1 wherein said device further includes switch means, an actuating lever for said switch means and plunger solenoid means controlled by said switch means coupled to said mode change over means, said actuating lever being movable from a first position to a second position responsive to actuation of one of said push buttons thereby to energize said plunger solenoid through said switch means to move said mode change over means from its said first rest position to a second operative position corresponding to the selected mode of said one of said push buttons.

7. A mode change over device according to claim 1 wherein said mode change over means comprises a mode change over lever member and wherein spring means are connected between said mode change over lever member and said mode selecting means to urge said mode change over lever member to its first rest position.

8. A mode change over device according to claim 1 in which said drive means comprises gear means operatively connected with the rotating capstan of said recording and/or reproducing apparatus.

9. A mode change over device according to claim 8 including a second gear member operatively engaged with said gear means, said second gear member including a cam member fixed thereto, said cam member operatively engageable with said mode change over means to move said mode change over means from its said rest position to one of said plurality of operating positions corresponding to the operative mode selected by the particular push button which has been activated.

10. A mode change over device according to claim 9 wherein said second gear member includes a segment without gear teeth to engage said gear means whereby when said segment is in juxtaposed relationship with said gear means said second gear member is not driven by said gear means.

* * * * *